United States Patent

Tanikita et al.

[11] Patent Number: 5,833,889
[45] Date of Patent: Nov. 10, 1998

[54] METHOD OF MANUFACTURING LIGHT REFLECTOR COMPONENT AND LIGHT REFLECTOR COMPONENT MANUFACTURED BY THE METHOD

[76] Inventors: Masumi Tanikita, 42-17 Misono 1-chome, Itabashi-ku, Tokyo 175; Akira Fusamoto, 10-50-301 Souei-machi, Numazu-shi, Shizuoka-ken 410, both of Japan

[21] Appl. No.: 619,715
[22] PCT Filed: Aug. 2, 1995
[86] PCT No.: PCT/JP95/01532
§ 371 Date: Jul. 25, 1996
§ 102(e) Date: Jul. 25, 1996
[87] PCT Pub. No.: WO96/04575
PCT Pub. Date: Feb. 15, 1992

[30] Foreign Application Priority Data

| Aug. 3, 1994 | [JP] | Japan | 6-182364 |
| Jun. 22, 1995 | [JP] | Japan | 7-156336 |

[51] Int. Cl.$^6$ ..................................................... B29D 11/00
[52] U.S. Cl. ............................. 264/1.9; 264/2.5; 362/61; 362/83.1
[58] Field of Search ........................ 264/1.9, 553, 554, 264/2.5; 362/61, 83.1

[56] References Cited

U.S. PATENT DOCUMENTS

| 3,337,660 | 8/1967 | Bagby et al. | 264/1.9 |
| 3,839,129 | 10/1974 | Neumann | 264/1.9 |
| 4,154,788 | 5/1979 | Hockensmith et al. | 264/554 |
| 4,406,045 | 9/1983 | Schweb | 264/1.9 |
| 4,570,203 | 2/1986 | Daniels et al. | 264/1.9 |
| 4,781,870 | 11/1988 | Talbert | 264/1.9 |
| 5,275,764 | 1/1994 | Hettinga | 264/1.9 |
| 5,413,743 | 5/1995 | Prophet | 264/1.9 |
| 5,614,131 | 3/1997 | Mukerji et al. | 264/1.9 |

FOREIGN PATENT DOCUMENTS

| 59-98823 | 6/1959 | Japan . |
| 5-174601 | 7/1993 | Japan . |
| 6-320576 | 11/1994 | Japan . |
| WO 80/02684 | 12/1980 | WIPO | 264/1.9 |

*Primary Examiner*—Mathieu D. Vargot

[57] ABSTRACT

The present invention provides light reflector component having a reflective surface of sufficiently high accuracy. As shown in FIGS. 2(*a*) and 2(*b*), an injection mold 3 used to manufacture a light reflector component of the invention includes a male half 3*a* and a female half 3*b*. A resin film 1 having a shape of light reflective surface is placed on a protrusion element 4 formed on the male half 3*a* of the injection mold 3 which is set in a clamp mechanism of an injection molding apparatus (not shown). After the injection mold 3 is closed, a molten resin 6 is injected into a space defined by the male half 3*a* and the female half 3*b*.

10 Claims, 3 Drawing Sheets

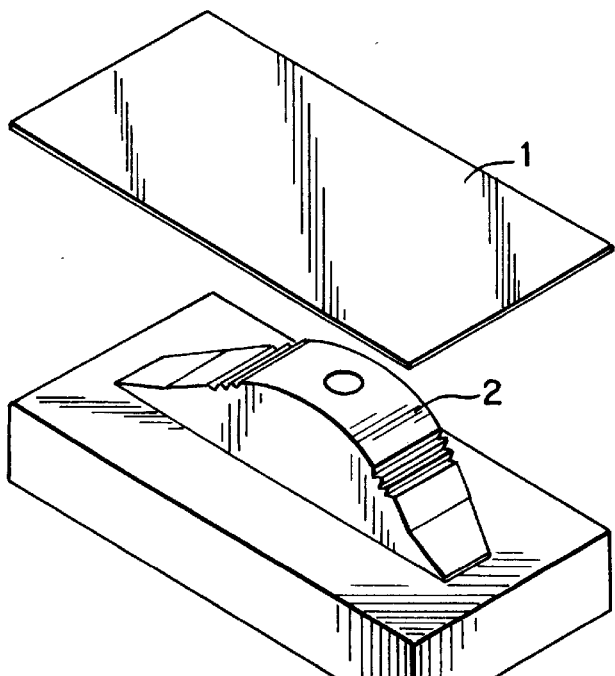
Fig.1a
Fig.1b
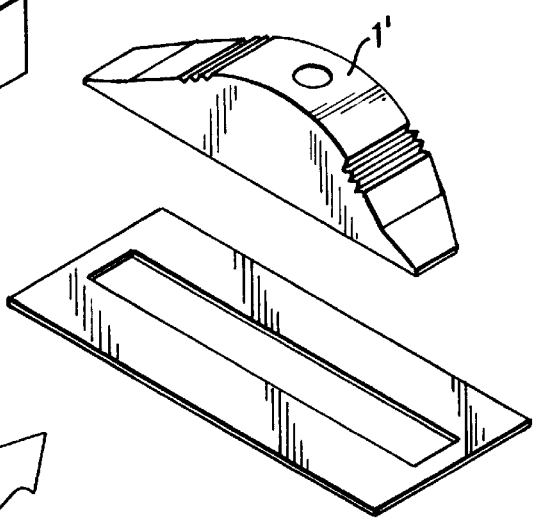
Fig.1c

METHOD OF MANUFACTURING LIGHT REFLECTOR COMPONENT AND LIGHT REFLECTOR COMPONENT MANUFACTURED BY THE METHOD

[INDUSTRIAL FIELD]

The present invention relates to a method of manufacturing resin components having a light reflector surface as well as to a light reflector component manufactured by the method.

[PRIOR ART]

The chief material of parts having a light reflective surface, such as lamp reflectors, has been changed from metal to synthetic resin. At present, most of such light reflector components include a base member composed of a bulk molding compound (hereinafter referred to as BMC) and an aluminum or another metal deposit or coat formed on the light-reflecting surface of the base member.

According to one proposed method of manufacturing a light reflector component, the base member is composed of a thermoplastic resin and the light-reflecting surface of the base member is coated with a metal. This method has been noted because of the good moldability and workability of thermoplastic resins and potential recovery and recycling of the resins.

Another method disclosed in JAPANESE PATENT PUBLICATION GAZETTE No. 3-45688 applies an aluminum sheet previously formed to a shape of reflective surface onto a base member.

In the conventional method of manufacturing a light reflector component by making the base member out of a BMC and coating the light-reflecting surface of the base member with a metal, application of a primer is required prior to the process of coating the base member with a metal. The primer reduces the roughness of the light-reflecting surface so as to improve the reflecting properties and enhance the adhesive properties of the base member with the metal coating.

Thermoplastic coating material is generally used for the primer, which consumes time for the drying process. The liquid primer often causes sags after coating. As shown in FIG. 5, this may result in uneven coating of a primer 7 on the stepped portions and edges of a base member M, thereby lowering the accuracy of the shape of light reflective surface.

In the proposed method of manufacturing a light reflector component by making the base member out of a thermoplastic resin instead of the BMC and coating the light-reflecting surface of the base member with a metal, application of a primer is generally required prior to the process of coating the base member with a metal. This method is also not free from the drawbacks accompanied with the application of a primer as discussed above.

In the method of making the base member out of a thermoplastic resin, it is rather difficult to balance the properties required for light reflector components, that is, the heat resistance, strength, and rigidity, with the light reflecting properties. Variation in composition of the thermoplastic resin has been studied for improving the balance. The technique for enhancing the heat resistance, strength, and rigidity is generally in conflict with the technique for improving the light reflecting properties. No practical technique for settling the balance has been completed yet.

The method disclosed in JAPANESE PATENT PUBLICATION GAZETTE No. 3-45688 forms a thick coating, whose merit is that the light reflecting properties are not affected by the surface of resin components. For the small and simple-contoured components, such as stroboscopes for photography, no problems arise in the process of shaping an aluminum sheet to the light reflective surface. Components having the large and long light reflective surface of complicated shape, such as lamp reflectors of automobiles, have a problem of relatively low accuracy in shape, especially on the stepped portions and edges.

[SUMMARY OF THE INVENTION]

The object of the present invention is to provide a light reflector component manufactured by a simple process to have excellent reflecting properties and good heat resistance and mechanical properties. The first invention is characterized by a method of manufacturing a light reflector component, which includes the steps of: placing a thermoplastic resin film having a shape of light reflective surface closely onto an inner wall of a closed mold; injecting a molten resin into a cavity of the closed mold to form a molded object having a layer of the thermoplastic resin film arranged as a light reflective surface; and coating the layer of thermoplastic resin film with a metal film to complete the light reflective surface. The second invention is characterized by the method of manufacturing a light reflector component, wherein the resin film is composed of any material selected among the group consisting of polycarbonates, thermoplastic polyesters, polyamides, poly (phenylene sulfides), polyarylates, and resins including any one of the preceding polymers as a main component.

The third invention is characterized by the method of manufacturing a light reflector component, wherein the molten resin is selected among the group consisting of poly(phenylene sulfides), thermoplastic polyesters, polyamides, and resins including any one of the preceding polymers as a main component. The fourth method is characterized by the method of manufacturing a light reflector component, wherein the molten resin comprises a bulk molding compound. The fifth invention is characterized by the method of manufacturing a light reflector component, wherein the light reflector component is a lamp reflector.

The sixth invention is characterized by a light reflector component manufactured by a method in accordance with any one of the first invention through the fifth invention.

In the present invention, the film includes any thin plate-like sheets.

Preheating the thermoplastic resin film enhances the extensibility and flexibility thereof and allows the thermoplastic resin film to be formed into any complicated shape. The subsequent cooling process enables the thermoplastic resin film to maintain the rigidity while keeping the shape. Even in the case of deep drawing, a desired shape of a uniform thickness can be given to the thermoplastic resin film.

The light-reflecting surface of a part coated with a layer of the thermoplastic resin film is comparable to the surface formed by application of a primer. The method of the present invention does not require application of a primer but completes the excellent light reflective surface simply by coating the layer of the thermoplastic resin film on the light-reflecting surface of the part with a metal.

An appropriate amount of a primer may be applied with a view to enhancing the adhesive properties of the metal coating with the resin.

[BRIEF DESCRIPTION OF THE DRAWINGS]

FIGS. 1(a), 1(b) and 1(c) show a process of giving a shape of light reflective surface to a resin film;

[BEST MODE FOR EMBODYING THE INVENTION]

Production of a lamp reflector for automobiles according to the method of the present invention is described with the accompanying drawings.

In FIGS. 1(a) and 1(b), numeral 1 represents a resin film. A shape corresponding to a concave light reflective surface of a lamp reflector for automobiles is given to the resin film 1.

Although material of the resin film used in the present invention is not specifically limited, preferable examples by taking into account the heat resistance and the optical properties include polycarbonates, thermoplastic polyesters, polyamides, poly(phenylene sulfides), polyarylates, and resins including any one of the preceding polymers as a main component. The preferable thickness of the film ranges from 0.1 to 0.5 mm.

In the embodiment, a polycarbonate resin film (0.3 mm in thickness) is used.

A desired shape is given to the resin film 1 by the process of vacuum forming in the embodiment. Referring to FIGS. 1(b) and 1(c), the preheated resin film 1 is closely placed on a projection mold 2 corresponding to a shape of light reflective surface. After the resin film 1 is cured, the non-required periphery of the cured resin film 1 is trimmed to give a contoured resin film 1' having the concave shape as shown in FIG. 1(c).

Figure 2A:
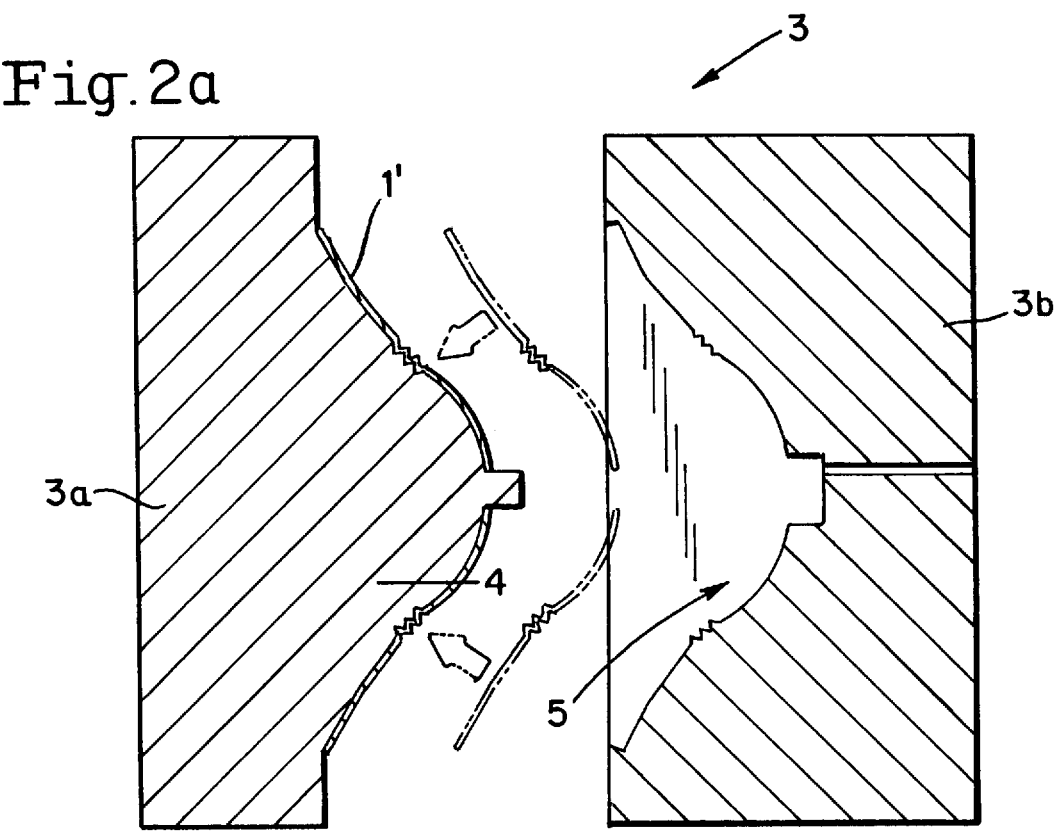
FIGS. 2(a) and 2(b) show an exemplified process of producing a lamp reflector according to the method of the present invention.
Figure 2B:
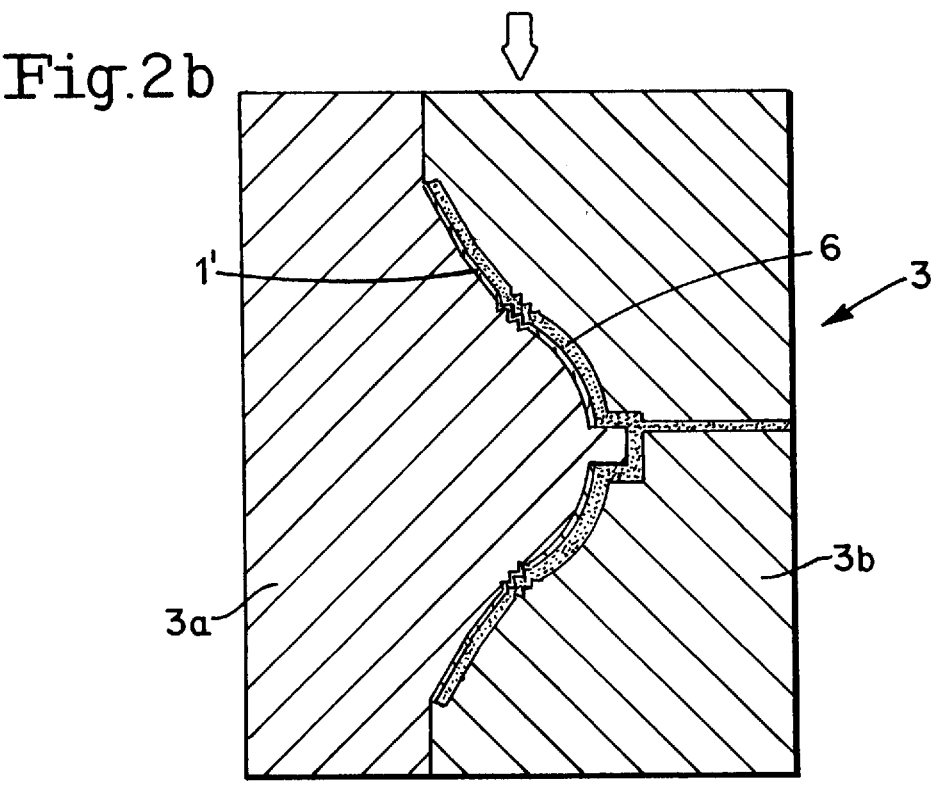

The contoured resin film 1' of concave shape is set into an injection mold 3 as shown in FIGS. 2(a) and 2(b).

The injection mold 3 includes a male half 3a and a female half 3b and set in a clamp mechanism of an injection molding apparatus (not shown). The male half 3a has a protrusion element 4 corresponding to a shape of light reflective surface of a final product, that is, a lamp reflector, is formed on the male half 3a, whereas the female half 3b has a concave element 5 corresponding to a shape of rear surface of the lamp reflector.

The contoured resin film 1' is set in the open mold 3 to come into close contact with the protrusion element 4 of the male half 3a (see FIG. 2(a)).

After the contoured resin film 1' is set in the mold 3, the mold 3 is closed and a molten resin 6 is injected into a space defined by the male half 3a and the female half 3b (see FIG. 2(b)).

Although the resin injected into the mold for the above purpose in the present invention is not specifically limited, preferable examples by taking into account the heat resistance, mechanical properties, dimensional stability, and moisture resistance include thermoplastic resins, such as poly(phenylene sulfides), thermoplastic polyesters, polyamides, and resins including any one of the preceding polymers as a main component.

Another preferable example is BMCs including a thermosetting resin, such as an unsaturated polyester resin, as the resin base.

Molten resins applied in the embodiment include one obtained by mixing 40% by weight of glass fibers with a poly(phenylene sulfide), one obtained by mixing 30% by weight of glass fibers with a poly(butylene terephthalate), which is one of the thermoplastic polyesters, and a BMC including an unsaturated polyester resin as the resin base.

Figure 3:
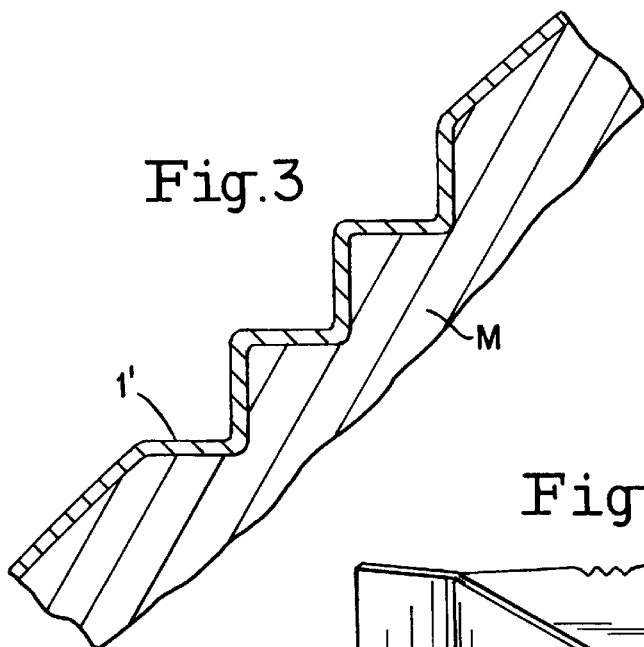
FIG. 3 shows a light reflective surface composed of a resin film layer.

After the resin composition is cooled and cured, a resulting molded object is removed from the mold. The molded object has a uniform and integral layer of the contoured resin film 1' formed on the concave surface of a base member M in the shape of a lamp reflector. The layer of the contoured resin film 1' has a fine surface roughness and a high dimensional accuracy (see FIG. 3).

Figure 4:
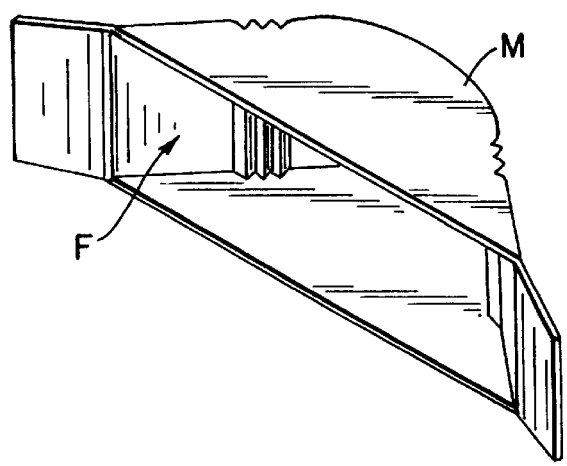
FIG. 4 shows a lamp reflector as a completed product.
Figure 5:
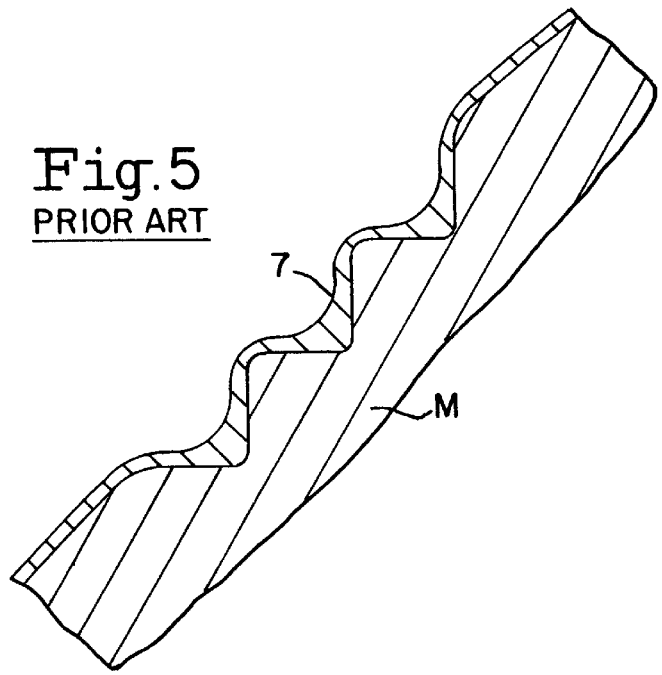
FIG. 5 shows a conventional example processed with a primer.

Deposition of aluminum onto the concave surface gives a lamp reflector having a light reflective surface F with high imaging properties (see FIG. 4).

The resin film layer is integrally formed on the concave surface of the base member, which is favorable for the light reflecting properties. The concave surface coated with the resin film layer is not affected by the surface properties of the base member. Inexpensive materials even with poor surface roughness may accordingly be used for the resin composition of the base member, as long as it has sufficient heat resistance, mechanical strength, and dimensional accuracy. A filler may be mixed with the resin composition according to the requirements.

This structure realizes a light in weight, thin-walled base member and allows a variation in resin composition for the purpose of reinforcing the base member without taking into account the surface properties of the modified composition. Since the degree of freedom is increased for the selection of material, resin components of such structure may go into a wide range of novel applications.

As is generally known, surface treatment, such as irradiation of an ultraviolet ray or plasma processing, enhances the adhesive properties of the concave surface coated with an aluminum deposit. Surface treatment of the resin film layer of the embodiment resulted in a significant improvement in adhesive properties of the base member with aluminum.

Table 1 shows the results of a peel test of the aluminum deposit and evaluation of the imaging properties.

The peel test was carried out in the following manner. Each test piece having a resin film layer integrally formed on the surface of a flat plate composed of a base resin (containing 30% by weight of glass fibers) was prepared by the process of insert molding. Aluminum was deposited on the surface of resin film (thickness of deposit: 1,000 angstrom). The peeling properties of the aluminum deposit were evaluated by the 2 mm-squares tape peel test. The results of the peel test and the imaging properties at the time of peel test are tabulated.

For the purpose of comparison, the similar test was performed for BMC base members without a film and PPS base members without a film.

The results of the peel test are expressed as the number of peeled deposits per 100 test pieces.

These results showed that the resin film integrally formed on the surface of the base member significantly improved the adhesive properties and imaging properties of the metal deposit.

TABLE XX1

| BASE MATERIAL | FILM (*1) | DEPOSIT PEEL TEST | IMAGING PROPERTY (*2) (%) |
|---|---|---|---|
| PPS | PET | 0/100 | 84.3 |
| PPS | PC | 0/100 | 93.6 |
| PPS | PAR | 0/100 | 90.5 |
| PPS | PA | 0/100 | 80.3 |
| PPS | PPS | 2/100 | 80.8 |
| PET | PC | 0/100 | 94.1 |
| PA | PC | 0/100 | 93.0 |
| BMC | PC | 0/100 | 93.8 |
| BMC | NONE | 45/100 | 67.2 |
| PPS | NONE | 35/100 | 70.8 |

*1: No primer
*2: Mapping property meter (manufactured by Suga Shikenki)
PPS: poly(phenylene sulfide)
PBT: poly(butylene terephthalate)
PA : polyamide
PET: poly(ethylene terephthalate)
PC : polycarbonate
PAR: polyacrylate
BMC: bulk molding compound Although the above embodiment refers to a lamp reflector for automobiles, the light reflector component of the present invention may be applicable to stroboscopes for photography, searchlights, and light sources of optical equipment. The thermoplastic resin sheet and the coating metal are not limited to those in the above embodiment.

The light reflective surface may have a convex shape, a flat shape, or any desirable complicated shape other than the concave shape of the embodiment.

The method of the present invention integrally forms a resin film layer on the light-reflecting surface of a base member, thereby not requiring application of a primer, which has conventionally been applied prior to the metal coating process. The structure of the present invention thus effectively solves the problem of the conventional structure. Since the surface properties of the light reflective surface are favorably kept by the resin film layer, a desirable resin composition having sufficient heat resistance, mechanical strength, and dimensional accuracy may be freely selected as the base member without taking into account the surface properties of the resin composition.

The thermoplastic resin film having the shape of light reflective surface is securely joined with the light-reflecting surface of a base member. This structure ensures a high accuracy of the resulting light reflective surface and is suitably applicable to lamp reflectors having a large and long light reflective surface of complicated shape.

We claim:

1. A method of manufacturing a concave- or convex-shaped light reflector component having excellent reflecting properties and good heat resistance and mechanical properties, said method comprising the steps of: (i) placing a thermoplastic resin film having a shape of a light reflective surface closely onto an inner wall of an open mold; (ii) closing said mold; (iii) injecting a molten resin into a cavity of said closed mold to form a molded object having a base member and an outer layer, wherein said base member is formed of said molten resin and said outer layer comprises said thermoplastic resin film arranged as a light reflective surface on a facial surface of said base member, said molten resin being such as to provide the base member with good heat resistance, mechanical strength and dimensional accuracy; (iv) removing said molded object from the mold; and (v) depositing a metal onto said thermoplastic resin film of said molded object so as to form a metal film thereon to complete said light reflective surface, thereby forming a light reflector component comprising said base member, said thermoplastic resin film and said metal film, wherein:

(a) said thermoplastic resin film has a concave shape and said mold is adapted so that the base member of said molded object formed in said mold has a concave facial surface corresponding to the concave shape of the thermoplastic resin film such that said thermoplastic resin film is integral with said concave facial surface of the base member, or (b) said thermoplastic resin film has a convex shape and said mold is adapted so that the base member of said molded object formed in said mold has a convex facial surface corresponding to the convex shape of the thermoplastic resin film such that said thermoplastic resin film is integral with said convex facial surface of the base member.

2. A method in accordance with claim 1, wherein said resin film is composed of any material selected among the group consisting of polycarbonates, thermoplastic polyesters, polyamides, poly(phenylene sulfides), polyarylates, and resins comprising any one of the preceding polymers as a main component.

3. A method in accordance with claim 1, wherein said molten resin is selected among the group consisting of poly(phenylene sulfides), thermoplastic polyesters, polyamides, and resins comprising any one of the preceding polymers as a main component.

4. A method in accordance with claim 1, wherein said molten resin comprises a bulk molding compound.

5. A method in accordance with claim 1, wherein said light reflector component is a lamp reflector.

6. A concave- or convex-shaped light reflector component manufactured by a method comprising the steps of: (i) placing a thermoplastic resin film having a shape of a light reflective surface closely onto an inner wall of an open mold; (ii) closing said mold; (iii) injecting a molten resin into a cavity of said closed mold to form a molded object having a base member and an outer layer, wherein said base member is formed of said molten resin and said outer layer comprises said thermoplastic resin film arranged as a light reflective surface on a facial surface of said base member, said molten resin being such as to provide the base member with good heat resistance, mechanical strength and dimensional accuracy; (iv) removing said molded object from the mold; and (v) depositing a metal onto said thermoplastic resin film of said molded object so as to form a metal film thereon to complete said light reflective surface, thereby forming said light reflector component, said light reflector component comprising said base member, said thermoplastic resin film and said metal film, wherein:

(a) said thermoplastic resin film has a concave shape and said mold is adapted so that the base member of said molded object formed in said mold has a concave facial surface corresponding to the concave shape of the thermoplastic resin film such that said thermoplastic resin film is integral with said concave facial surface of the base member, or (b) said thermoplastic resin film has a convex shape and said mold is adapted so that the base member of said molded object formed in said mold has a convex facial surface corresponding to the convex shape of the thermoplastic resin film such that said thermoplastic resin film is integral with said convex facial surface of the base member.

7. A method in accordance with claim 1, wherein said method consists essentially of steps (i)–(v).

8. A method in accordance with claim 1, wherein the step of depositing the metal on the thermoplastic film to form the metal film is such that the metal film has a thickness of 1000 angstroms.

9. A component in accordance with claim 6, wherein said component consists essentially of said base member, said thermoplastic resin film and said metal film.

10. A component in accordance with claim 6, wherein said metal film has a thickness of 1000 angstroms.

* * * * *